Feb. 3, 1970 P. A. ROCK 3,493,447
METHOD OF AND APPARATUS FOR PREPARATION OF
SPECIMENS FOR MICROSCOPIC EXAMINATION
Original Filed Dec. 1, 1964 2 Sheets-Sheet 1

Inventor
Peter Adrian Rock
Attorneys

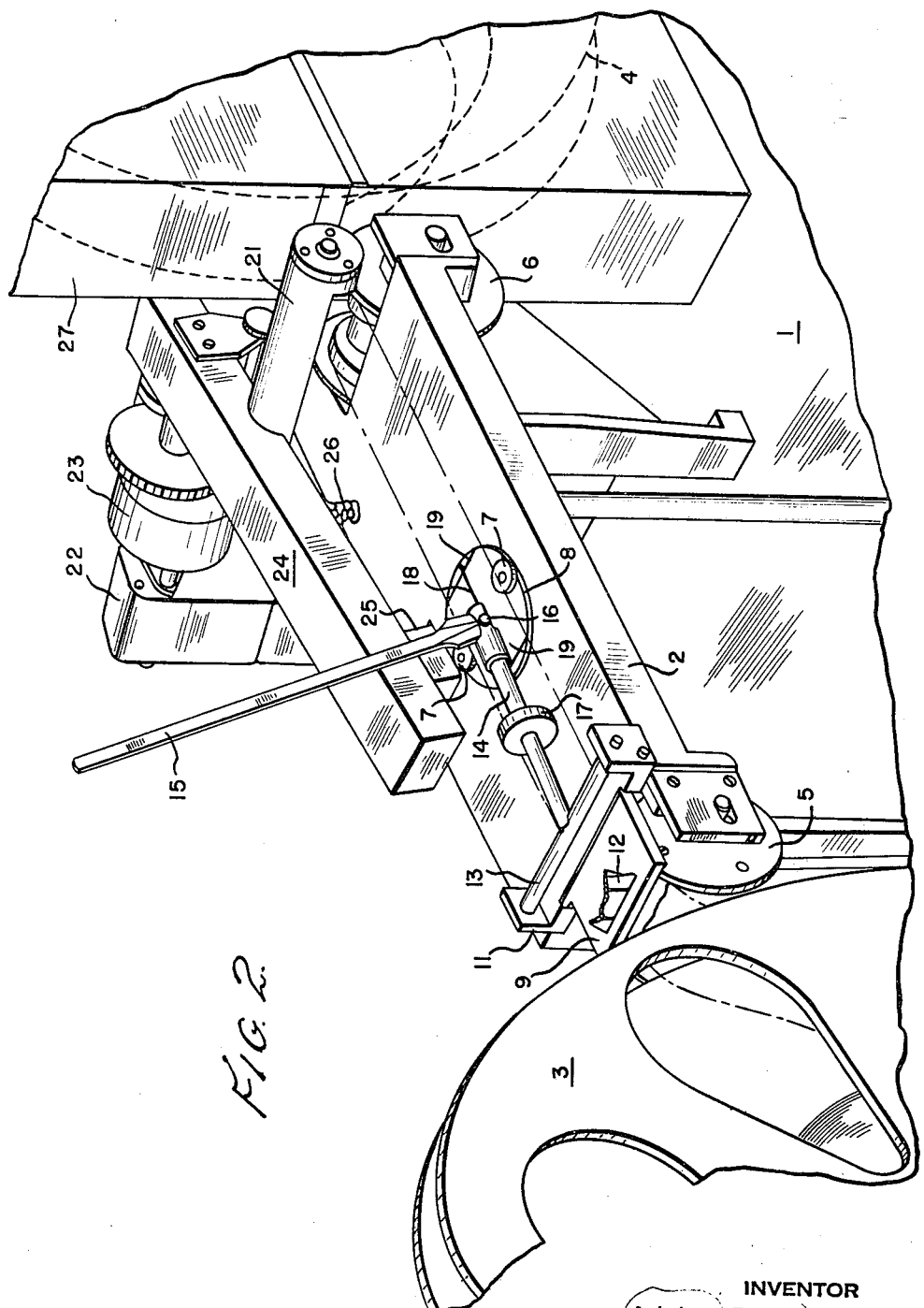

United States Patent Office 3,493,447
Patented Feb. 3, 1970

3,493,447
METHOD OF AND APPARATUS FOR PREPARATION OF SPECIMENS FOR MICROSCOPIC EXAMINATION
Peter Adrian Rock, Pristina, The Bull Ring, Nuneaton, Warwickshire, England
Continuation of application Ser. No. 415,028, Dec. 1, 1964. This application Mar. 14, 1969, Ser. No. 808,718
Claims priority, application Great Britain, Dec. 4, 1963, 47,833/63
Int. Cl. B32b *31/04*
U.S. Cl. 156—57                                    10 Claims

ABSTRACT OF THE DISCLOSURE

The invention relates to the preparation of specimens of cellular or particulate substance suspended in a liquid for microscopic examination and consists in applying a series of traces of the respective specimens onto a transparent film by drawing them on the film, and fixing the series of traces on the film.

---

This application is a continuation of U.S. application Ser. No. 415,028, filed Dec. 1, 1964 and now abandoned.

The invention relates to a method of, and apparatus for, the preparation, for microscopic examination, of specimens of cellular or particulate substance suspended in a liquid.

According to one aspect of the invention there is provided a method of preparing, for microscopic examination, a number of specimens of cellular or particulate substance suspended in a liquid, wherein a series of traces of the respective specimens are drawn onto a transparent film whereafter the traces are subjected to the action of a fixing medium.

According to another aspect of the invention there is provided apparatus for preparing, for microscopic examination, a number of specimens of cellular or particulate substance suspended in a liquid, including means for traversing a film through a recording station, a writing head capable of applying to said film whilst travelling through said station the specimens to be examined so as to cause a series of traces of the specimens to be drawn on the film and means arranged in the path of the film for fixing the recorded traces.

In order that the invention may be more fully understood, one construction of apparatus, in accordance with the invention, will now be described, by way of example, with reference to the accompanying drawing.

In the drawing:

FIG 2 is a broken perspective view on an enlarged scale of the central portion of the apparatus shown in FIG. 1.

Figure 1:
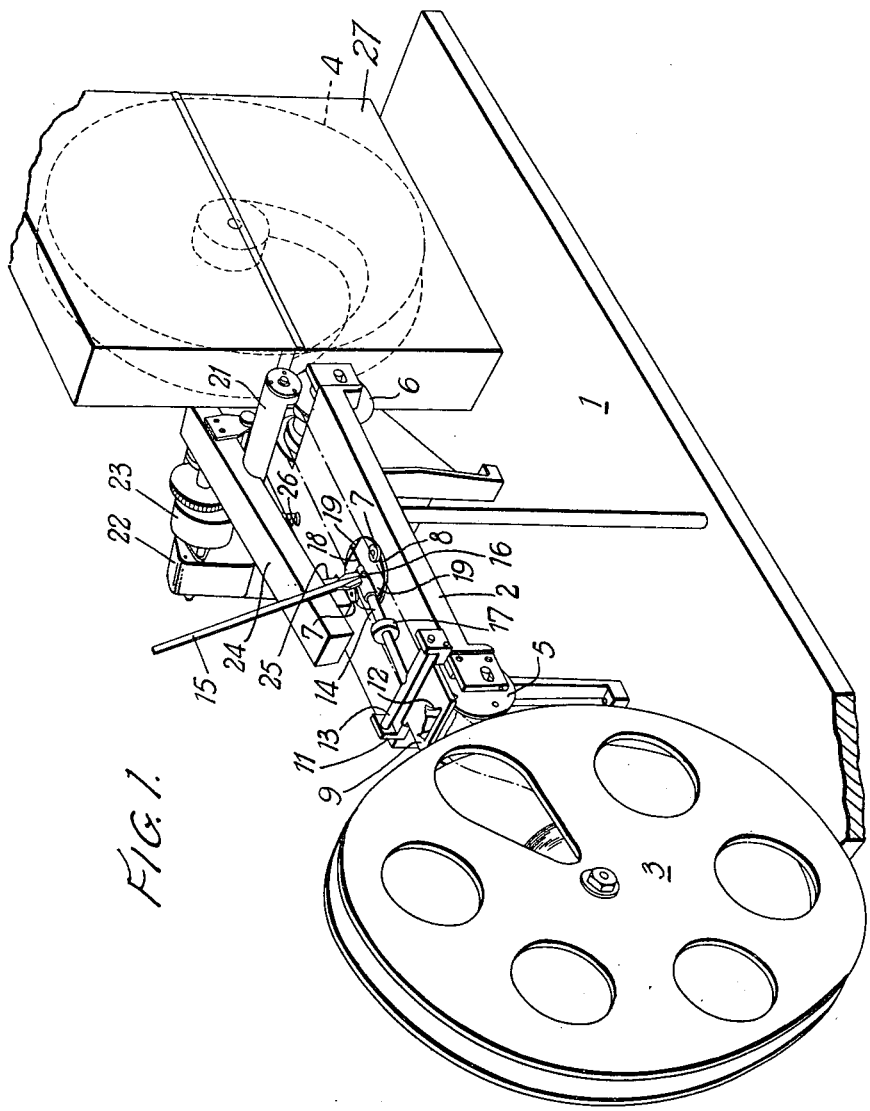
FIG. 1 is a perspective view of the apparatus.

Referring to the drawing, the apparatus includes a base 1, which carries a table 2 over which a transparent film is arranged to be drawn as will be described later.

The film is taken from a supply spool 3 mounted on a stand (not shown) forming part of the base, and is fed onto a storage spool 4 likewise mounted on a stand (not shown) which would also form part of the base.

Adjacent the supply spool 3, the table carries a guide roller 5 to guide the film onto the table and similarly at the other end of the table, the latter carries a second guide roller 6 to guide the film from the table onto the spool 4. Furher guide means for the film are provided in the form of two guide wheels 7 mounted on a support pad 8 forming part of the table 2. Above the roller 5 is a plate 9 which is hinged to an inverted yoke 11 secured to the table 2, the yoke being shaped to permit passage thereunder of the film from the spool 5 to the table. The plate 9 carries a cleaning pad 12 in the form of a strip of cloth passing through the plate to bear on the upper face of the film and the cloth, which is soaked in alcohol or other suitable cleaning liquid, thus serves to clean the upper face of the film as it passes over the guide roller 5. The yoke 11 also provides a bearing for a pivot bar 13 from which an arm 14 projects, the arm carrying at its free end a spreading spatula 15. The free end of the arm 14 is bifurcated to provide a supporting jaw for the spatula and one limb of the jaw carries a grub screw 16 whereby the spatula is securely held in position. The function of the spatula is to draw a trace of the specimens to be examined over the film as it traverses the table. Here it should be mentioned that the apparatus will include a number of spatulas each of which is similar to the spatula 15 and by the successive use of the spatula, a series of traces of specimens to be examined can be drawn on the film. To achieve the desired application pressure of the spatula on the film, the arm 14 carries a weight 17 which is slidable so that the pressure can be varied.

The lower end of each spatula is provided with a concave recess extending throughout the length of this end edge and the axis of the recess lies in the direction of film travel. In order to form a ridge on the film to extend into the recess, the pad 8 carries a rod 18 soldered at each end to a transverse rod 19, the rods 19 being soldered to the pad 8.

In order to propel the film over the table, the apparatus includes a friction contact roller which is shrouded by a hood 21 and is not itself, therefore, visible in the drawing. The curved roller surface is of rubber or other suitable friction material and is driven from a motor 22 through a reduction unit 23. The driving roller is shaped only to contact the film over both edge regions thereof, the central region of the film being untouched by the driving roller. The roller, together with its hood 21 and also the motor and the reduction unit is mounted on a bar 24 as a separate assembly, the bar being secured to a post 25 which depends through the table 2 to a pivot, not shown, whereby the driving roller may be moved towards and away from a position of driving contact with the film at the guide roller 6. The bar 24 is in fact biased away from the table by a spring 26 so that the roller is normally clear of the film, and when it is required to produce a trace, the bar is depressed to bring the driving roller into contact with the film. The bar carries a switch for the motor which is arranged to start the motor as the driving roller is brought into contact with the film and to stop the motor as the bar is released. The spool 4 which is, of course, the take-up spool is provided with a driving motor, not shown, arranged to drive a supporting spindle for the spool to which the latter is keyed. The latter motor is also arranged to be controlled by movement of the bar 24 simultaneously with the motor 22 and this motor is arranged lightly to tension the length of film between the spool 4 and the roller 6.

Each trace will require fixing after it has been drawn on the film and for this purpose the storage spool 4 is enclosed in a vessel in the form of a tank 27. The tank is in two parts having a detachable top part which will have a clearance slot to clear the driving spindle for the spool 4, and a lower part which contains a fixing liquid, for example, alcohol. The dimensions of the tank are such as to allow the spool 4 readily to be removed from its spindle, upon removal of the upper tank part, and a fresh spool to be mounted on the apparatus. The liquid level in the tank will be just sufficiently high so that the film becomes completely immersed in the fixing liquid as it passes into the tank and before it is wound onto the spool.

In operation of the apparatus, assume the leading end of the supply spool to have been drawn over the table and threaded onto the spool 4 in known manner. The top part of the tank 27 which will, of course, have been removed, is then replaced. A sample of the first specimen to be examined is taken onto a spatula which is mounted on the arm 14 and lowered onto the film portion over the pad 8. Thereafter the bar 24 is depressed to inch the film forward, which is itself lifted into the recess in the spatula as it passes over the rod 18, to draw a trace of the specimen over the film. The arm 14 which, in conjunction with the spatula, constitutes a writing head, is then lifted by hand whilst the bar is still depressed so that the film continues to move forward a short distance without drawing a trace in order to leave a blank space for a perforated code identification. The trace may then be identified by a perforated marking and a fresh specimen drawn onto the film by using a fresh spatula and by drawing a further length of film through the recording station defined by the pad 8. This specimen too will be provided with an identification and thus a series of specimens, each having its own identification, will be applied to the film until the latter has been completed. As the film enters the tank the respective specimens are fixed.

In the particular application of the apparatus mentioned above the specimens will require to be stained on the film before the completed film is microscopically examined and/or stored for records purposes and subsequent examination. For this purpose a separate piece of apparatus may be provided, the apparatus consisting of a series of baths containing the required stains and washing fluids, through which the film is driven continuously. It may also be desired to cover the film before final storage with another, thinner, plastic film which may be self-adhesive to adhere to the film carrying the specimens. An attachment to the staining apparatus may be used to apply to the film bearing the stained specimens such a transparent covering film, the additional provision of the covering film enabling the specimen bearing film to be stored in relatively tightly wound rolls without damage until required for examination.

When it is desired subsequently to examine a particular specimen recorded on the film, the latter can be placed in an apparatus which will cause the film to be unwound from the storage spool and pass over the stage of a microscope. In this connection it should be noted that the apparatus for drawing the traces on the film will be designed to produce a trace of a width such that it will be within the field of view of the chosen microscope objective.

Although a writing head in the form of simple spreading spatula has been described above this being suitable for the relatively viscous substance constituting the specimens concerned, this may, however, be replaced by a capillary tube pen for more free flowing liquids. As a further alternative a felt swab may be used, the swab being suitably shaped so that it will draw a trace.

It will be appreciated that the invention provides a convenient method of preparing specimens particularly when such specimens are likely to require storing for some considerable time and compares favourably with existing methods of taking specimens and applying them to individual microscope slides. Furthermore the application of the specimens to a continuous film enables a pattern recognising computer to be employed in the examination of the specimens since it is then only necessary to pass the film through the computer.

While the diagnosis of carcinoma has been given as an application for which the invention is particularly suitable, other applications will be found in the general field of cytology, and in the fields of bacteriology, hematology and particle size analysis.

What is claimed is:

1. A method of preparing a number of specimens of cellular or particulate substance suspended in a liquid for microscopic examination, comprising the steps of traversing a length of transparent film through a recording station, delivering the liquid containing the specimens to a writing member located at said station in a position adjacent to the film moving therethrough, drawing a series of individual traces of the liquid containing the specimens with the writing member upon a surface of the transparent film as it travels through the station, and subjecting the substance of the traces which are drawn upon the film to the action of a fixing medium.

2. The method as claimed in claim 1, including the steps of cleaning the surface of the film to which the traces are to be drawn while moving the length of film toward said station, and covering the traces on the film with a further transparent film which adheres to the first mentioned film.

3. Apparatus for preparing, for microscopic examination, a number of specimens of cellular or particulate substance suspended in a liquid, including a recording station for recording the specimens on a film, means for traversing a length of film through said recording station, a writing head at said station incorporating a capillary tube for applying to said film while travelling through said station the specimens to be examined, and means cooperating with said capillary tube for applying a series of traces of the specimens onto the film.

4. Apparatus as claimed in claim 3, including a table a part of which forms said station, said writing head including an arm pivotally mounted on said table and carrying said capillary tube.

5. Apparatus for preparing, for microscopic examination, a number of specimens of cellular or particulate substance suspended in a liquid, including a recording station for recording the specimens on a film, means for traversing a length of film through said recording station, a writing head at said station incorporating a spreading spatula for applying to said film while travelling through said station the specimens to be examined, and means cooperating with said spatula for applying a series of traces of the specimens onto the film.

6. Apparatus as set forth in claim 5, wherein the spatula has an edge surface which is presented to the film, said edge surface having a concave specimen-receiving recess disposed with its axis extending parallel to the film, and said apparatus including a support bar mounted on the table and arranged to deflect the film into a ridge to extend into the recess as it is propelled over the table.

7. Apparatus as claimed in claim 5, including a cleaning pad arranged to clean the face of the film on which the specimens are to be recorded prior to the film passing through the recording station.

8. Apparatus as claimed in claim 5, including a table a part of which forms said station, said writing head including an arm pivotally mounted on said table and carrying said spreading spatula.

9. Apparatus as set forth in claim 8, wherein said traversing means incorporates a film guiding roller mounted on the table to guide the film from the supply spool onto the table, a further guide roller mounted on the table to guide the film from the table onto the storage spool, and two lateral film engaging guide rollers mounted on the table at said station.

10. Apparatus as claimed in claim 9, wherein the writing head is arranged to produce traces of specimens centrally of the film and the film traversing means includes a friction driving roller arranged for movement into and out of a position of contact with the edge regions of the portion of the film supported by said further roller.

References Cited

UNITED STATES PATENTS

| | | |
|---|---|---|
| 1,858,308 | 5/1932 | Schiller. |
| 2,055,215 | 9/1936 | Dreyer _____ 96—63 XR |
| 2,891,443 | 6/1959 | Pollock _____ 95—75 XR |
| 2,899,363 | 8/1959 | Nieburgs _____ 117—3 XR |
| 3,333,826 | 8/1967 | Kessler _____ 167—84.5 |

OTHER REFERENCES

Weibel et al., June 19, 1960, The Preparation of Serial Microscopic Sections in form of Plastic Films, pp. 1–4; from the Dept. of Anatomy of the Univ. of Zuerich.

Pickett et al., 355 mm. Film as Mounting Base and Plastic Spray as Cover Glass for Histological Sections, June 19, 1960, pp. 1–4, from Abstract from the Dept. of Pathology, Duke Univ. Medical Center.

HAROLD ANSHER, Primary Examiner

G. W. MOXON II, Assistant Examiner

U.S. Cl. X.R.

35—20; 117—3; 156—213, 383; 350—92; 424—3